(12) United States Patent
Patra et al.

(10) Patent No.: US 12,152,780 B2
(45) Date of Patent: Nov. 26, 2024

(54) METHOD OF SUPPLYING FUEL AND AIR TO A COMBUSTOR WITH AN IGNITION TUBE

(71) Applicant: GENERAL ELECTRIC COMPANY, Schenectady, NY (US)

(72) Inventors: Ajoy Patra, Bengaluru (IN); Pradeep Naik, Bengaluru (IN); Perumallu Vukanti, Bengaluru (IN); Michael T. Bucaro, Arvada, CO (US); R Narasimha Chiranthan, Bengaluru (IN); Manampathy G. Giridharan, Evendale, OH (US); Michael A. Benjamin, Cincinnati, OH (US); Clayton S. Cooper, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/302,346

(22) Filed: Apr. 18, 2023

(65) Prior Publication Data

US 2023/0304665 A1    Sep. 28, 2023

Related U.S. Application Data

(63) Continuation of application No. 17/689,070, filed on Mar. 8, 2022, now Pat. No. 11,649,966.
(Continued)

(51) Int. Cl.
*F23R 3/28*     (2006.01)
*F02C 7/264*    (2006.01)
(Continued)

(52) U.S. Cl.
CPC .............. *F23R 3/286* (2013.01); *F02C 7/264* (2013.01); *F23D 14/64* (2013.01); *F23R 3/045* (2013.01);
(Continued)

(58) Field of Classification Search
CPC ........ F02C 7/26; F02C 7/264; F05D 2260/99; F23D 14/64; F23R 3/045; F23R 3/286; F23R 2900/03343
See application file for complete search history.

(56) References Cited

U.S. PATENT DOCUMENTS 2,540,642 A * 2/1951 Allen .................... F23R 3/48
                                                    60/746
3,954,389 A    5/1976 Szetela
(Continued)

FOREIGN PATENT DOCUMENTS

CA    2626259 C    10/2007
EP    0019022 B1   10/1983
(Continued)

Primary Examiner — Scott J Walthour
(74) Attorney, Agent, or Firm — McGarry Bair PC

(57) ABSTRACT

A method of supplying a first fuel and air mixture and a second fuel and air mixture to a combustor. The combustor having a combustion chamber, a dome wall at least partially defining the combustion chamber, at least one fuel cup provided in the dome wall, and at least one ignition tube having an outlet exhausting to the combustion chamber. The method comprising supplying a first flow of compressed air to only the at least one ignition tube, igniting the first fuel and air mixture, supplying the first ignited fuel and air mixture of the combustion chamber, and supplying a second flow of fuel and a second flow of compressed air to the at least one fuel cup.

20 Claims, 6 Drawing Sheets

Related U.S. Application Data

(60) Provisional application No. 63/311,242, filed on Feb. 17, 2022.

(51) Int. Cl.
*F23D 14/64* (2006.01)
*F23R 3/04* (2006.01)
*F23R 3/50* (2006.01)

(52) U.S. Cl.
CPC ............ *F23R 3/50* (2013.01); *F05D 2240/35* (2013.01); *F05D 2260/99* (2013.01); *F23D 2207/00* (2013.01)

(56) References Cited

U.S. PATENT DOCUMENTS

| | | | |
|---|---|---|---|
| 5,673,554 A | 10/1997 | DeFreitas et al. | |
| 9,476,399 B1 | 10/2016 | Munson | |
| 10,041,413 B2 | 8/2018 | Huang et al. | |
| 10,520,196 B2 | 12/2019 | Okazaki et al. | |
| 10,711,699 B2 | 7/2020 | Dam et al. | |
| 11,226,103 B1 | 1/2022 | Ryon et al. | |
| 2004/0104538 A1 | 6/2004 | Pidcock et al. | |
| 2004/0221582 A1* | 11/2004 | Howell | F23R 3/343 60/778 |
| 2006/0101814 A1* | 5/2006 | Saitoh | F23R 3/343 60/377 |
| 2012/0291447 A1 | 11/2012 | Boardman et al. | |
| 2020/0080480 A1* | 3/2020 | Horikawa | F02C 7/228 |
| 2022/0136445 A1 | 5/2022 | Ryon et al. | |
| 2022/0136696 A1 | 5/2022 | Ryon et al. | |
| 2022/0195920 A1 | 6/2022 | Ryon et al. | |
| 2022/0195934 A1 | 6/2022 | Ryon et al. | |
| 2022/0195937 A1* | 6/2022 | Ryon | F23R 3/343 |
| 2022/0195938 A1* | 6/2022 | Ryon | F23R 3/16 |

FOREIGN PATENT DOCUMENTS

| | | |
|---|---|---|
| EP | 1424469 B1 | 8/2011 |
| EP | 3282192 1 | 3/2019 |
| FR | 3022986 A1 | 1/2016 |
| KR | 101037456 A1 | 5/2011 |

\* cited by examiner

METHOD OF SUPPLYING FUEL AND AIR TO A COMBUSTOR WITH AN IGNITION TUBE

CROSS-REFERENCE TO RELATED APPLICATIONS

This application is a continuation of U.S. patent application Ser. No. 17/689,070, filed Mar. 8, 2022, now U.S. Pat. No. 11,649,966, granted May 16, 2023, which claims priority to U.S. Provisional Application Ser. No. 63/311,242, filed Feb. 17, 2022, the contents of each is incorporated herein by reference.

TECHNICAL FIELD

The disclosure generally relates to a method of supplying a flow of fuel and air to a combustor for a turbine engine, and more specifically to a method of supplying a flow of fuel and air to an ignition system for the combustor.

BACKGROUND

A gas turbine engine includes a turbine that is driven by combustion of a combustible fuel within a combustor of the turbine engine. The turbine engine utilizes a fuel injector assembly to inject the combustible fuel into the combustor. The fuel injector assembly can mix the fuel with air prior to injection in order to achieve efficient combustion.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
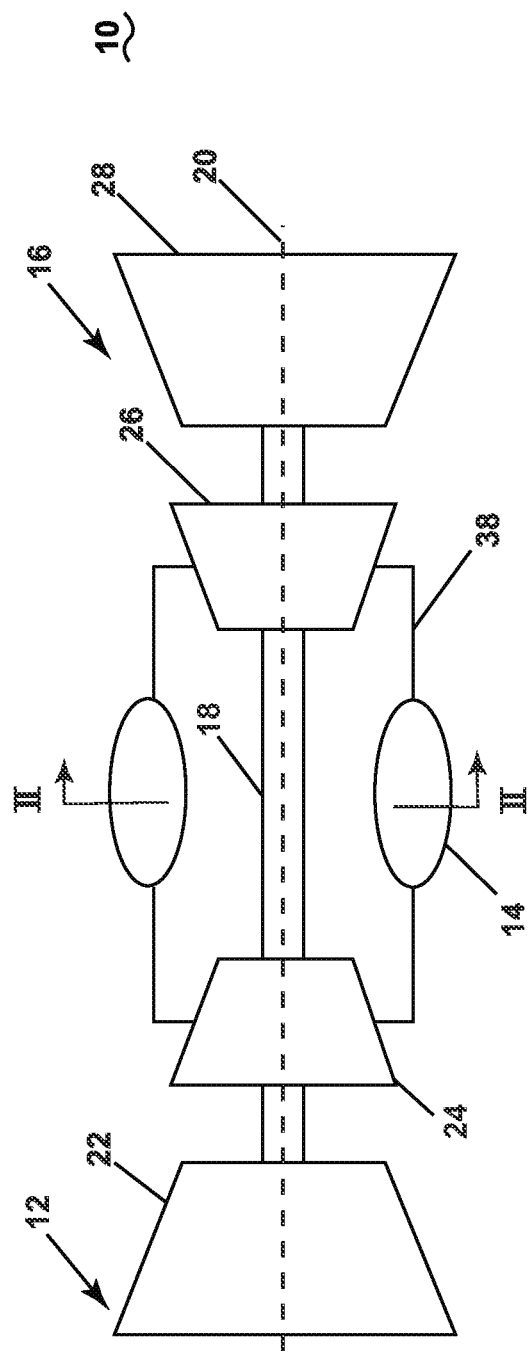
FIG. 1 is a schematic cross-sectional diagram of a turbine engine for an aircraft, the turbine engine including a combustion section.

Aspects of the disclosure described herein are generally directed to a combustion section for a turbine engine. The combustion section including a combustion chamber, a fuel injector fluidly coupled to a flow of a fuel, a swirler fluidly coupled to a compressed air, and at least one ignition tube fluidly coupled to a flow of fuel and the compressed air, which can be the same as the injector/swirler. The fuel from the fuel injector and the compressed air from the swirler can mix to define a fuel air mixture prior to flowing out of a fluid outlet and into the combustion chamber. At least a portion of the compressed air and the fuel can be mixed within the at least one ignition tube to define an ignition mixture. The at least one ignition tube can include at least one igniter that can ignite the ignition mixture. The ignition mixture, once ignited, can flow from the at least one ignition tube and into the combustion chamber where it ignites the fuel air mixture from the fluid outlet. The ignition tube, as described herein, can replace a traditional igniter which is placed within the combustion chamber, downstream of injector/swirler. The fuel can include any suitable fuel. As a non-limiting example, the fuel can contain hydrogen (hereinafter, hydrogen-containing fuel) that is mixed with the compressed airflow downstream of the fuel injector. Hydrogen-containing fuel typically has a wider flammable range and a faster burning velocity than traditional fuels, such as petroleum-based fuels or petroleum and synthetic fuel blends. The burn temperatures for hydrogen-containing fuel can be higher than the burn temperatures of traditional fuel, such that existing engine designs for traditional fuels would not be capable of operating under the heightened temperatures. The combustion section, as described herein, provides for an ignition system suitable to ignite the hydrogen-containing fuel or a mixture of fuel and compressed air.

For purposes of illustration, the present disclosure will be described with respect to the turbine for an aircraft turbine engine. It will be understood, however, that aspects of the disclosure described herein are not so limited and may have general applicability within an engine, including compressors, power generation turbines, as well as in non-aircraft applications, such as other mobile applications and non-mobile industrial, commercial, and residential applications.

Reference will now be made in detail to the combustor architecture, and in particular the fuel injector and swirler for providing fuel to the combustor located within a turbine engine, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The singular forms "a", "an", and "the" include plural references unless the context clearly dictates otherwise. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary. The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines an engine centerline 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
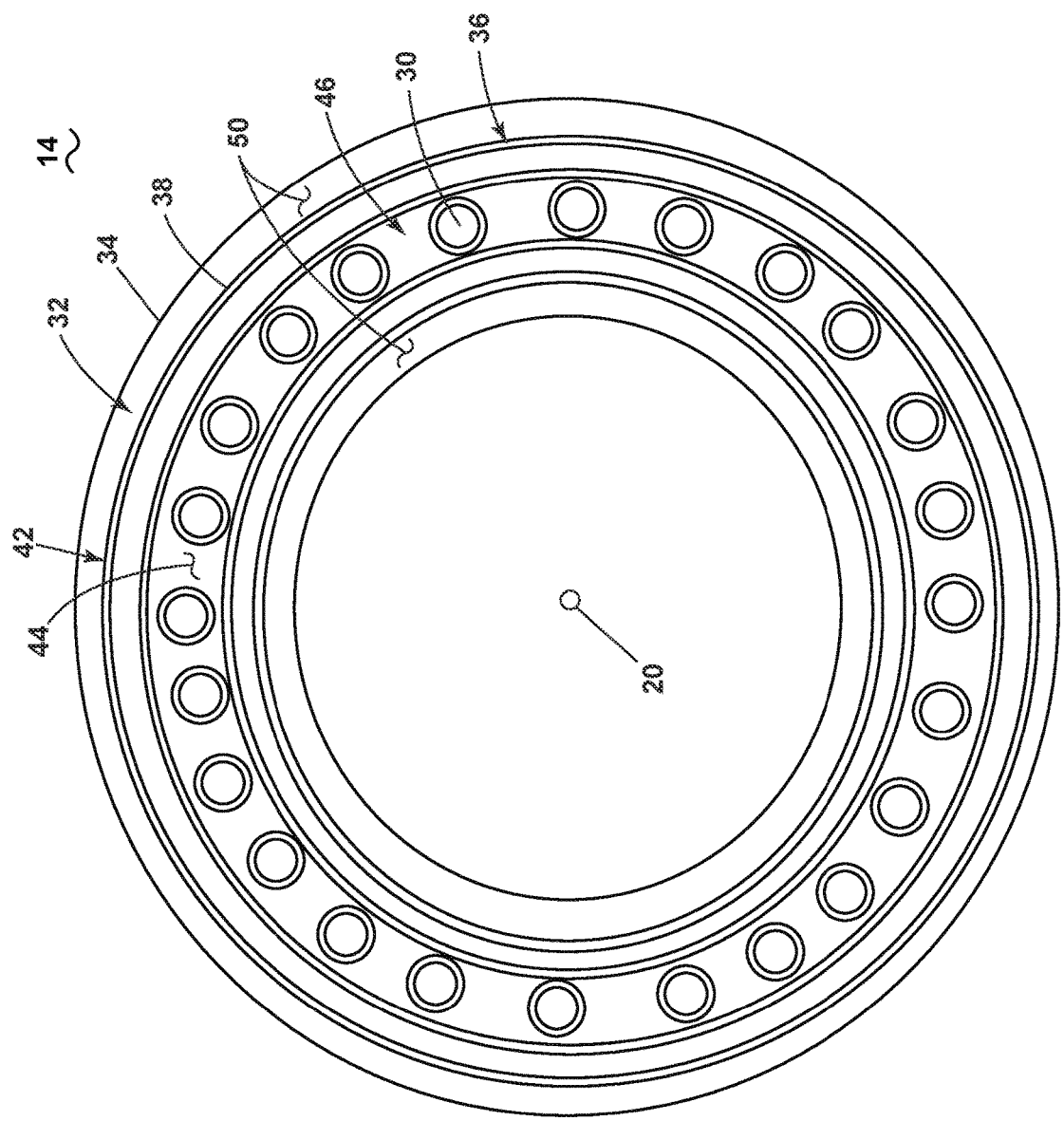
FIG. 2 is a schematic cross-sectional view of a portion of the combustion section of FIG. 1, as seen from cut II-II of FIG. 0.1.

FIG. 2 depicts a cross-section view of the combustion section 14 along line II-II of FIG. 1. The combustion section 14 can include an annular arrangement of primary fuel injectors 30 disposed around the engine centerline 20 of the turbine engine 10. Each of the primary fuel injectors 30 can be connected to a combustor 32. It should be appreciated that the annular arrangement of primary fuel injectors 30 can be one or multiple fuel injectors and one or more of the primary fuel injectors 30 can have different characteristics. The combustor 32 can have a can, can-annular, or annular arrangement depending on the type of engine in which the combustor 32 is located. In a non-limiting example, an annular arrangement is illustrated and disposed within a casing 34. The combustor 32 is defined by a combustor liner 36. A dome assembly 42 including a dome wall 44 together with the combustor liner 36 can define a combustion chamber 46 annular about the engine centerline 20. At least one primary fuel injector 30, illustrated as multiple primary fuel injectors annularly arranged about the engine centerline 20, is fluidly coupled to the combustion chamber 46. A compressed air passage 50 can be defined at least in part by both the combustor liner 36 and the casing 34.

Figure 3:
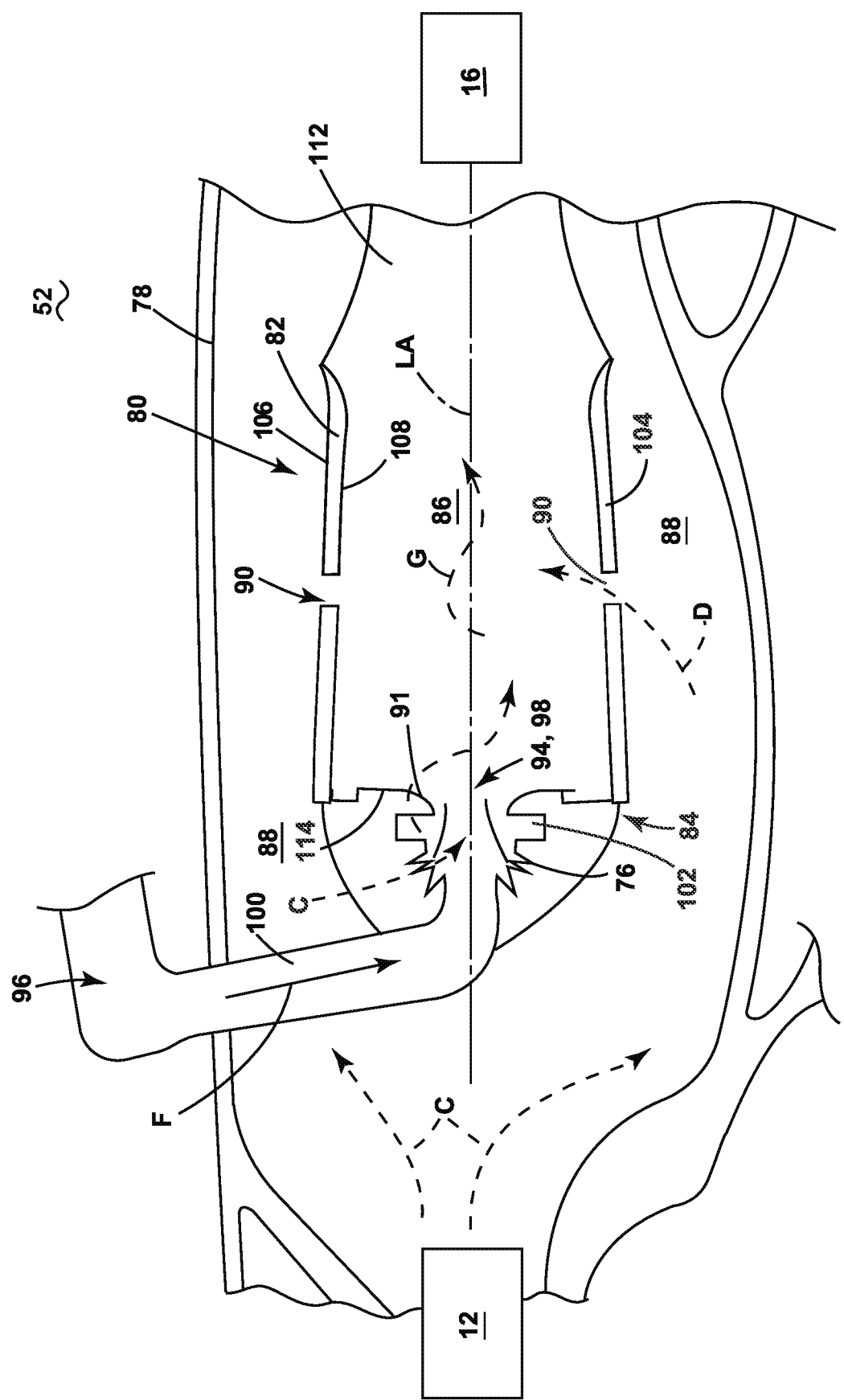
FIG. 3 is a schematic cross-sectional side view of a generic combustion section suitable for use as the combustion section of FIG. 1.

FIG. 3 depicts a schematic cross-sectional view of a generic combustion section 52 suitable for use as combustion section 14 of FIG. 1. The combustion section 52 can include an annular arrangement of fuel injectors 76 each connected to a combustor 80. It should be appreciated that the annular arrangement of fuel injectors 76 can be one or multiple fuel injectors and one or more of the fuel injectors 76 can have different characteristics and that the one fuel injector 76 is shown is for illustrative purposes only and is not intended to be limiting. The combustor 80 can have a can, can-annular, or annular arrangement depending on the type of turbine engine in which the combustor 80 is located. In a non-limiting example, an annular arrangement is illustrated and disposed within a casing 78. The combustor 80 can include an annular combustor liner 82, a dome assembly 84 including a dome wall 114 which together define a combustion chamber 86 about a longitudinal axis (LA). A compressed air passage 88 can be defined at least in part by both the annular combustor liner 82 and the casing 78. At least one fuel injector 76 is fluidly coupled to the combustion chamber 86. A passage can fluidly connect the compressed air passage 88 and the combustor 80. The passage can be defined by at least one set of dilution openings 90 located in the annular combustor liner 82.

The fuel injector 76 can be coupled to and disposed within the dome assembly 84 upstream of a flare cone 91 to define a fuel outlet 94. The fuel injector 76 can include a fuel inlet 96 that can be adapted to receive a flow of a fuel (F) (e.g., a hydrogen-containing fuel) and a linear fuel passageway 100 extending between the fuel inlet 96 and the fuel outlet 94. A swirler 102 can be provided at a dome inlet 98 to swirl incoming air in proximity to fuel (F) exiting the fuel injector 76 and provide a homogeneous mixture of air and fuel entering the combustor 80. As used herein, the term "swirl" or iterations thereof can refer to a directional movement of a fluid in at least two directions (e.g., radial, circumferential, and/or axial). A "swirl" can be formed as a twisting or spiraling pattern.

The annular combustor liner 82 can be defined by a wall 104 having an outer surface 106 and an inner surface 108 at least partially defining the combustion chamber 86. The wall 104 can be made of one continuous monolithic portion or be multiple monolithic portions assembled together to define the annular combustor liner 82. By way of non-limiting example, the outer surface 106 can define a first piece of the wall 104 while the inner surface 108 can define a second piece of the wall 104 that when assembled together form the annular combustor liner 82. As described herein, the wall 104 includes the at least one set of dilution openings 90. It is further contemplated that the annular combustor liner 82 can be any type of annular combustor liner 82, including but not limited to a double walled liner or a tile liner.

During operation, compressed air (C) can flow from the compressor section 12 to the combustor 80 through the compressed air passage 88. The at least one set of dilution openings 90 in the annular combustor liner 82 allow passage of at least a portion of the compressed air (C), the portion defining a dilution airflow (D), from the compressed air passage 88 to the combustion chamber 86.

Some compressed air (C) can be mixed with the fuel (F) from the fuel injector 76 which can be ignited by one or more igniters (not illustrated) to generate combustion gas (G). The combustion gas (G) is mixed using the dilution airflow (D) supplied through the at least one set of dilution openings 90, and mixes within the combustion chamber 86, after which the combustion gas (G) flows through a combustor outlet 112 and exits into the turbine section 16.

Figure 4:
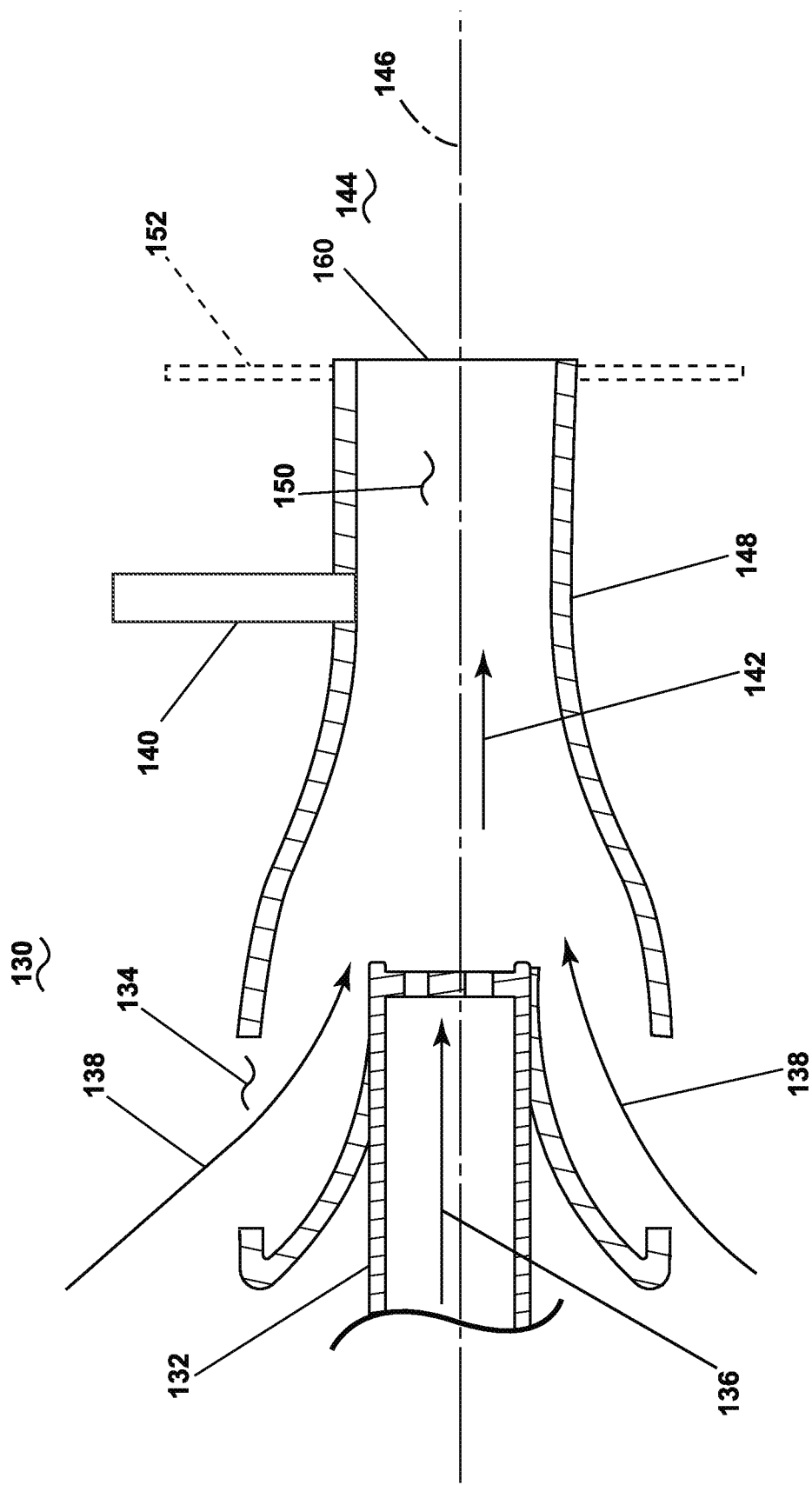
FIG. 4 is a cross-sectional view of an ignition tube suitable for use within the combustion section of FIG. 1 or the combustion section of FIG. 3, the ignition tube having an ignition fuel injector, a compressed air passage, and an igniter.

FIG. 4 is a cross-sectional view of an ignition tube 130 suitable for use within the combustion section 14 of FIG. 1 or the combustion section 52 of FIG. 3. The ignition tube 130 can extend through a combustion chamber wall 152, which at least partially defines a combustion chamber 144. As a non-limiting example, the combustion chamber wall 152 can be the dome wall (e.g., the dome wall 114) or a portion of the combustor liner (e.g., the annular combustor liner 82). The dome wall and the combustion liner can collectively define the combustion chamber 144. The ignition tube 130 can include an igniter wall 148, an ignition fuel injector 132, a compressed air passage 134, and an igniter 140. The compressed air passage 134, the ignition fuel injector 132, and the igniter 140 can all extend through corresponding portions of the igniter wall 148. The ignition fuel injector 132 can include a flow of a fuel 136. The compressed air passage 134 can include a compressed air 138. The fuel 136 and the compressed air 138 can mix downstream of the ignition fuel injector 132 to define an ignition mixture 142. The igniter 140 can be configured to ignite the ignition mixture 142. The ignited ignition mixture 142 can then flow out of the ignition tube 130.

The ignition tube 130 can be defined by a centerline axis 146 extending through the ignition tube 130. The centerline axis 146 can be parallel to the longitudinal axis (e.g., the longitudinal axis (LA) of FIG. 3) of the combustion chamber 144. Alternatively, the centerline axis 146 can be non-parallel to the longitudinal axis of the combustion chamber 144. The centerline axis 146 can further be parallel to the engine centerline (e.g. the engine centerline 20 of FIGS.

1-2). Alternatively, the centerline axis 146 can be non-parallel to the engine centerline.

The igniter wall 148 of the ignition tube 130 can be formed as a tubular wall defining a fluid channel 150. The compressed air 138 and the fuel 136 can be mixed and ignited within the fluid channel 150. The igniter wall 148 can include one or more openings configured to accept or otherwise form a portion of the compressed air passage 134 or the ignition fuel injector 132. The igniter wall 148 of the ignition tube 130 can converge from an upstream end (e.g., a portion of the igniter wall 148 corresponding to the ignition fuel injector 132 and the compressed air passage 134) to a downstream end (e.g., a portion of the igniter wall 148 corresponding to the combustion chamber wall 152). As illustrated, the igniter wall 148 can converge non-linearly and non-constantly from the upstream end to the downstream end. It will be appreciated, however, that the igniter wall 148 can take any suitable shape when viewed along a plane extending parallel to the centerline axis 146 and intersecting the igniter wall 148. As a non-limiting example, the igniter wall 148 can extend non-linearly, linearly, non-constantly, constantly, at least partially diverge (e.g. a portion converges), or converge from the upstream end to the downstream end.

The combustion chamber 144 can extend an axial length with respect to a longitudinal axis (e.g., the longitudinal axis (LA) of FIG. 3). As a non-limiting example, the ignition tube 130 can be provided along a forward portion of the combustion chamber 144 with respect to the axial length of the combustion chamber 144. As a non-limiting example, the ignition tube 130 can be provided between 0 times and 0.4 times the axial length of the combustion chamber 144. In the case where the ignition tube 130 is provided at 0 times the axial length of the combustion chamber 144, the ignition tube 130 can be provided along an axially forward-most portion of the combustion chamber (e.g., the dome wall). In instances where the ignition tube 130 extends through a portion greater than 0 times the axial length of the combustion chamber 144, the ignition tube 130 can extend through any portion of the combustion chamber 144 that is axially aft of the forward-most portion of the combustion chamber with respect to the longitudinal axis (e.g., the combustor liner).

The ignition fuel injector 132 can extend through the igniter wall 148. The ignition fuel injector 132 can be fluidly coupled to the fuel 136. The ignition fuel injector 132 can supply the fuel 136 to the fluid channel 150. The fuel 136 can be any suitable fuel such as, but not limited to, the flow of the fuel (F) of FIG. 3. The fuel 136 can be a flow of hydrogen-containing fuel. As a non-limiting example, the fuel 136 can be pure hydrogen.

The compressed air passage 134 can be at least partially defined by an opening formed within the igniter wall 148. As a non-limiting example, the igniter wall 148 can include a continuous circumferential slit or circumferential channel that extends circumferentially about the entire igniter wall 148 with respect to the centerline axis 146, which can define the compressed air passage 134. As a non-limiting example, the igniter wall 148 can include a set of discrete passages or orifices provided circumferentially or axially about the igniter wall 148 with respect to the centerline axis 146, which can define the compressed air passage 134. The compressed air passage 134 can include the compressed air 138. The compressed air passage 134 can fluidly couple the compressed air 138 to the fluid channel 150. The compressed air 138 can be any suitable compressed airflow such as the compressed airflow (C) of FIG. 3. The compressed air passage 134 can be configured to supply the compressed air 138 to the ignition tube 130 in any suitable direction. As a non-limiting example, the compressed air passage 134 can at least partially swirl the compressed air 138 through the positioning of the compressed air passage 134. As a non-limiting example, the compressed air passage 134 can be formed along a portion of the igniter wall 148 such that the compressed air 138 flow through the compressed air passage 134 and into the fluid channel is swirled. As such, the compressed air passage 134 can be configured to supply the compressed air 138 to the ignition tube 130 as a swirled compressed air or a non-swirled compressed air.

The ignition fuel injector 132 can supply the fuel 136 to the ignition tube 130 in any suitable manner. As a non-limiting example, the ignition fuel injector 132 can supply the fuel 136 in an axial direction as a jet of fuel exiting the ignition fuel injector 132. As a non-limiting example, the ignition fuel injector 132 can swirl the fuel 136 such that the fuel 136 enters the fluid channel 150 as a swirled flow of the fuel. This can be used to increase the mixing efficiency (e.g., the uniformity of the mixing) of the fuel 136 and the compressed air 138 within the ignition tube 130. This ultimately increases the ignition efficiency once the ignition mixture 142 is ignited.

The igniter 140 can extend through a portion of the igniter wall 148 and be coupled to the fluid channel 150. As a non-limiting example, the igniter 140 can extend through a portion of the igniter wall 148 and into the fluid channel 150. The igniter 140 can be provided in any axial location on the igniter wall 148. The igniter 140 can be configured to ignite the ignition mixture 142 within the fluid channel 150. The igniter 140 can be any suitable igniter configured to ignite the ignition mixture 142. As a non-limiting example, the igniter 140 can be a spark igniter, a plasma igniter, blow torch, laser igniter, or any combination thereof.

The ignition tube 130 can extend through the combustion chamber wall 152 confronting the combustion chamber 144. The fluid channel 150 can include an outlet 160 directly fluidly coupled to the combustion chamber 144. The ignition tube 130, as illustrated, can extend axially through the combustion chamber wall 152 with respect to the centerline axis 146. It will be appreciated, however, that the ignition tube 130 can extend at an angle or radially through the combustion chamber wall 152 with respect to the centerline axis 146.

Figure 5B:
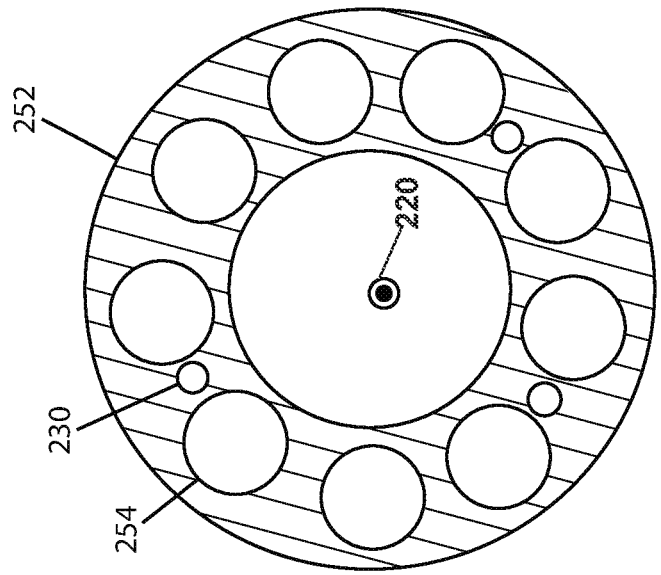
FIG. 5B, is schematic radial view of a dome wall suitable for use within the combustor of FIG. 1, the dome wall including at least one ignition tube circumferentially spaced with respect to at least one swirler.
Figure 5A:
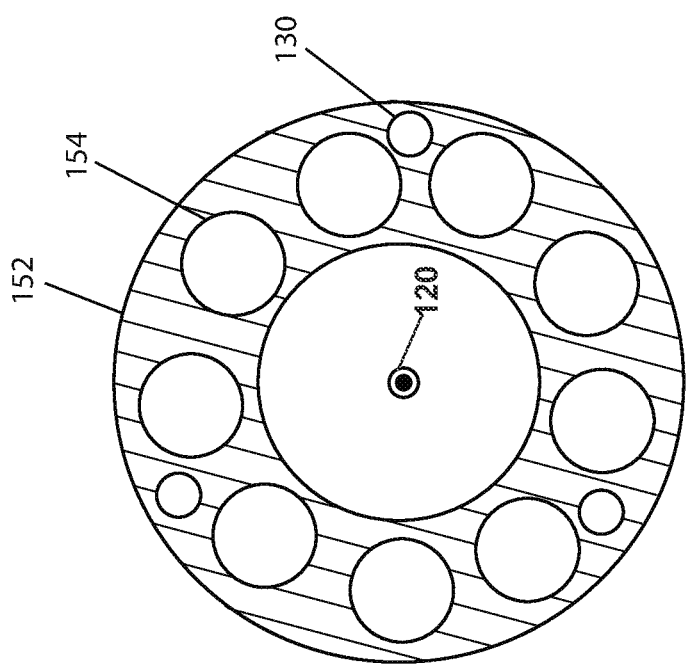
FIG. 5A, is schematic radial view of a dome wall suitable for use within the combustor of FIG. 1, the dome wall including at least one ignition tube circumferentially spaced with respect to at least one swirler.

FIG. 5A, is schematic axial view of the ignition tube 130 extending through the combustion chamber wall 152. FIG. 5A is a schematic illustration as seen from the combustion chamber 144 looking towards the combustion chamber wall 152. The combustion chamber wall 152 can be a portion of the combustor liner or the dome wall. As a non-limiting example, the combustion chamber wall 152, as illustrated, is a dome wall. A set of ignition tubes 130 can be circumferentially spaced between an annular array of fuel cups 154, with respect to an engine centerline 120 of the turbine engine (e.g., the engine centerline 20 of FIGS. 1-2). As a non-limiting example, the engine centerline 120 can be in-line, correspond to, or otherwise be parallel with the centerline axis 146 of FIG. 4. Alternatively, the engine centerline 120 can be non-parallel to the centerline axis 146. The annular array of fuel cups 154 can be circumferentially spaced about the combustion chamber wall 152 with respect to the engine centerline 120. Each fuel cup of the annular array of fuel cups 154 can include a swirler (e.g., the swirler 102 of FIG. 3) and a fuel injector (e.g., the fuel injector 76 of FIG. 3). Each fuel cup of the annular array of fuel cups 154 can be fluidly coupled to the combustion chamber via a fuel outlet (e.g., the fuel outlet 94 of FIG. 3). The annular array of fuel cups 154 can be defined by a portion of the combustion section that includes a flow of fuel or a mixture of fuel and compressed air that is not ignited before flowing into the combustion chamber. While illustrated as a can-annular combustor, it will be appreciated that the ignition tube 130 can be provided within a combustion chamber wall 152 of any suitable combustor. As a non-limiting example, the ignition tube 130 can be provided within a combustion chamber wall 152 of an annular combustor or a can combustor.

The annular array of fuel cups 154 can be circumferentially spaced about the combustion chamber wall 152 to define an annular array of fuel cups 154. There can be any number of one or more fuel cups provided along the combustion chamber wall 152. A combination of a swirler and a fuel injector can define a single fuel cup 154, which can otherwise be called a fuel cup. As such, the annular array of fuel cups 154 can be defined as an annular array of fuel cups.

Each ignition tube of the set of ignition tubes 130 can extend through a respective first portion of the dome wall. Each fuel cup 154 of the annular array of fuel cups 154 can extend through a respective second portion of the dome wall. The first portion(s) is different from and spaced from the second portion(s). The first portion can be circumferentially or radially spaced with respect to the second portion and with respect to the engine centerline 120. As a non-limiting example, each ignition tube of the set of ignition tubes 130 can be spaced circumferentially between fuel cups of the annular array of fuel cups 154, with respect to the engine centerline 120. Further, the set of ignition tubes 130 can be radially spaced from the annular array of fuel cups 154. As a non-limiting example, at least one of the ignition tubes 130 can be spaced a first radial distance from the engine centerline 120 and at least one of the at least one fuel cups 154 can be spaced a second radial distance from the engine centerline 120, with the first radial distance being larger than the second radial distance. As illustrated, the set of ignition tubes 130 can be equally spaced with respect to one another. In other words, each ignition tube 130 of the set of ignition tubes 130 can be spaced from an equal number of fuel cups of the annular array of fuel cups 154. As a non-limiting example, each ignition tube 130 of the set of ignition tubes 130 is placed after each three fuel cups 154 of the annular array of fuel cups 154. As such, the combustion chamber wall 152 can include a repeating pattern of one ignition tube 130 followed by three fuel cups 154. It will be appreciated, however, that there can be any number of ignition tubes 130 spaced between any number of fuel cups of the annular array of fuel cups 154. While three ignition tubes 130 and nine fuel cups 154 are illustrated, it will be appreciated that there can be any number of one or more ignition tubes 130 and any number of fuel cups 154.

Referring now to FIGS. 4 and 5A, during operation of the combustion section 52, the fuel 136 can flow into the ignition tube 130 through the ignition fuel injector 132. The compressed air 138 can flow through the compressed air passage 134. The fuel 136 and the compressed air 138 can mix within the fluid channel 150 to form the ignition mixture 142, which is then ignited by the igniter 140. The ignited ignition mixture 142 can then flow out of the ignition tube 130 and into the combustion chamber 144. As a non-limiting example, the ignited ignition mixture 142 can flow from the ignition tube 130 as an open flame. It is contemplated that the shape of the ignition tube 130 can be used to ensure that the ignition tube 130 operates as intended or desired. As a non-limiting example, the structure (e.g., at least partially converging from the upstream end to the downstream end) of the igniter wall 148 can be used to ensure that the ignition tube 130 operates as intended or desired. The converging structure of the igniter wall 148 can increase the velocity of the compressed air 138, the fuel 136, or the ignition mixture 142. This, in turn, ensures that an open flame does not propagate in a region of the ignition tube 130 that is near the compressed air passage 134 or the ignition fuel injector 132. As a non-limiting example, this ensures that flame holding (e.g., the propagation of a continuous flame) does not occur within the ignition fuel injector 132.

Subsequent to or in tandem with the fuel 136 and compressed air 138 being fed to the fluid channel 150 of the ignition tube 130, a flow of the fuel and a compressed air can also be fed to at least one fuel injector and swirler, respectively, (e.g., the flow of the fuel (F) and the compressed air (C) of FIG. 3) where it is mixed to define a fuel air mixture, which can then be fed to the combustion chamber 144 through the annular array of fuel cups 154. The fuel 136 and the compressed air 138 within the ignition tube 130 can be the same as the flow of the fuel and the compressed air, respectively, within the fuel injector and swirler. The flame (generated by igniting the ignition mixture 142) can then ignite the fuel air mixture within the combustion chamber 144. As such, the ignition tube 130 can act as an ignition source for the fuel air mixture from the fuel injector and swirler. The ignited fuel air mixture and the ignited ignition mixture 142 can, together or independently of one another, be used to generate combustion gases (e.g., the combustion gases (G) of FIG. 3), which can ultimately be used to drive the turbine engine.

It is contemplated that a volume of the ignition mixture 142 within the fluid channel 150 can be smaller than a total volume of the fuel air mixture flowing from the annular array of fuel cups 154. In other words, only a fraction of the total flow of fuel (e.g., the fuel 136 combined with the flow of the fuel within the fuel injector upstream of each fuel cup 154) needs to be ignited in order to ignite the remaining fuel or fuel air mixture within the combustion chamber 144.

The ignition tube 130 can be used during startup or normal operation of the turbine engine. In cases where the ignition tube 130 is used during startup, the fuel 136 can be selectively supplied to at least one ignition tube 130 and not to the fuel injectors provided upstream of the annular array of fuel cups 154. As a non-limiting example, the compressed air 138 can be provided to the ignition tube 130 at the same time that the fuel 136 is supplied to the ignition tube 130. As the turbine engine is not yet fully started, and the compressed air 138, during normal operation, can be from the compressor section of the turbine engine, the compressed air 138 during startup can come from a different source. As a non-limiting example, the compressed air 138 during startup can come from an air turbine starter, an accessory generator, a pump, or the like. In any case, the ignition mixture 142 is generated and ignited within the fluid channel 150. The ignited ignition mixture 142 can then flow into the combustion chamber 144 as an open flame. It is contemplated that at this time, the fuel and the compressed air can then be fed into at least a portion of the fuel injectors and the swirlers, where it ultimately flows through at least a portion of the annular array of fuel cups 154 as the fuel air mixture, which can then be ignited by the open flame from the ignited ignition mixture 142. Once ignited, the fuel air mixture and the ignited ignition mixture 142 can generate the combustion gases. Alternatively, the ignited ignition mixture 142 can be sufficient to generate the combustion gases needed to fully start the turbine engine (e.g., the compressor section is generating the compressed air). Once the turbine engine is fully started, the fuel and compressed air can be supplied to at least one fuel injector and at least one swirler to define the fuel air mixture flowing through the annular array of fuel cups 154. This fuel air mixture can then be ignited by the already ignited ignition mixture 142 to generate the combustion gases needed to continue the operation of the turbine engine.

After ignition of the fuel air mixture in the combustion chamber 144, each ignition tube 130 of the set of ignition tubes 130 can be individually or collectively controlled. As a non-limiting example, only the compressed air 138 can be fed through at least portion of the ignition tubes 130 after ignition has occurred in the combustion chamber 144. This, in turn, provides an additional compressed air source to the combustion chamber, which ultimately affects the shaping or profile of the flame within the combustion chamber 144. The control of the shape or profile of the flame within the combustion chamber 144 can ultimately help to improve combustor liner durability by not allowing flame to expand to the liner and reduce combustion dynamics within the combustion chamber 144. As used herein, the term "combustion dynamics" or iterations thereof, can refer to the generation of acoustic pressure oscillations that occur within the combustor from the ignition of the mixture of fuel and compressed air within the combustion chamber. It is contemplated that the control of the combustion dynamics can ultimately increase the lifespan of the combustion section. Further yet, the control of the output of the ignition tubes 130 can be used to produce a lean flame within the combustion chamber 144. As used herein, a lean flame can refer to a flame that is generated through a smaller use of fuel when compared to a rich flame. The use of a lean flame will not decrease the overall efficiency of the turbine engine when compared to the use of a rich flame, however, it will reduce the total amount of contaminants (e.g., NOx emissions) within the fluid leaving the combustion chamber 144 as less fuel is being ignited to produce the flame. As such, the control of the output of the ignition tubes 130 can be used to create a lean flame, which can ultimately reduce the environmental impact that the turbine engine has.

FIG. 5B, is schematic radial view of an exemplary combustion chamber wall 252 including an exemplary ignition tube 230 suitable for use within the combustor 80 of FIG. 1. The ignition tube 230 is similar to the ignition tube 130, therefore, like parts will be identified with like numerals increased to the 200 series, with it being understood that the description of the like parts of the ignition tube 130 applies to the ignition tube 130 unless otherwise noted.

A set of ignition tubes 230 are circumferentially spaced about the combustion chamber wall 252 with respect to an engine centerline 220 of the turbine engine, which can be in-line with, parallel to, or otherwise correspond to the centerline axis 146 of FIG. 4. Alternatively, the engine centerline 220 can be non-parallel to the centerline axis 146. The ignition tubes 230 can be provided a first radial distance from the engine centerline 220, while the at least one fuel cups 154 can be provided a second radial distance from the engine centerline 220. The first distance can be equal to or less than the second radial distance Each ignition tube of the set of ignition tubes 230 can be provided adjacent to at least one fuel cups of the annular array of fuel cups 254. The ignition tubes of the set of ignition tubes 230 can be equally or non-equally spaced between fuel cups 254. As a non-limiting example, any number of fuel cups 254 can be provided between adjacent ignition tubes 130 (e.g., there can be zero, one, two, three, four, etc. fuel cups 254 between each two adjacent ignition tubes 130). As a non-limiting example, there can be any number of ignition tubes 130 placed between two adjacent fuel cups 254 (e.g., there can be zero, one, two, three, etc. ignition tubes 130 between two adjacent fuel cups 254).

Figure 6:
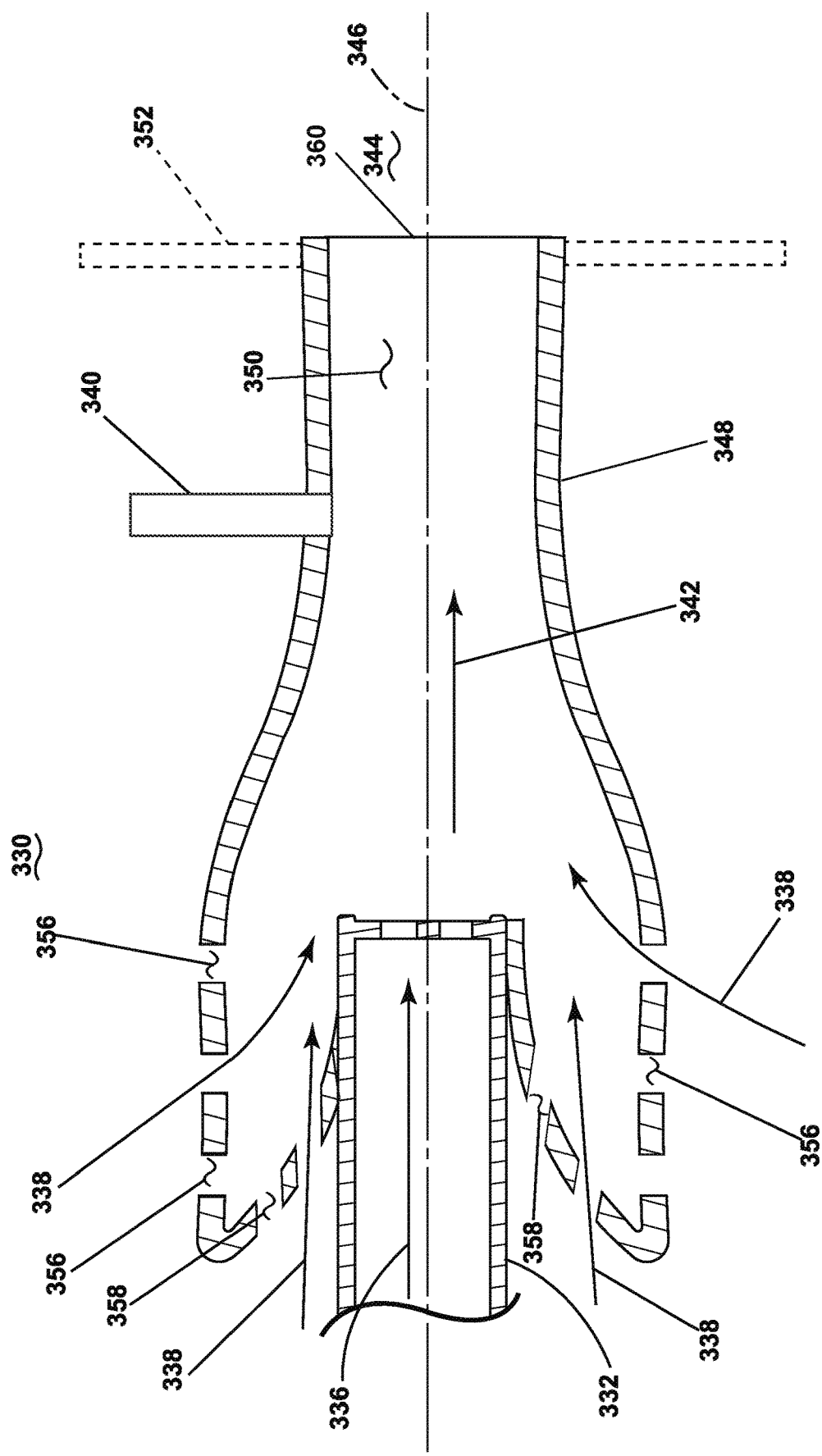
FIG. 6 is a cross-sectional view of an exemplary ignition tube suitable for use within the combustion section of FIG. 1 or the combustion section of FIG. 3, the exemplary ignition tube having an ignition fuel injector, a first compressed air passage, a second compressed air passage, and an igniter.

FIG. 6 is a cross-sectional view of an exemplary ignition tube 330 suitable for use within the combustion section 14 of FIG. 1 or the combustion section 52 of FIG. 3. The ignition tube 330 is similar to the ignition tube 130, 230, therefore, like parts will be identified with like numerals increased to the 300 series, with it being understood that the description of the like parts of the ignition tube 130, 230 applies to the ignition tube 330 unless otherwise noted.

The ignition tube 330 can include an igniter wall 348 defining a fluid channel 350 having an outlet 360 fluidly coupled to a combustion chamber 344. The ignition tube 330 can extend through a combustion chamber wall 352 confronting a portion of the combustion chamber 344. The ignition tube 330 can be defined by a centerline axis 346. An ignition fuel injector 332 can extend through the igniter wall 348 and include a flow of a fuel 336. At least one compressed air passage 334 can be formed through or within the igniter wall 348 and include a compressed air 338. The ignition fuel injector 332 and the compressed air passage 334 can fluidly couple the fuel 336 and the compressed air 338, respectively, to the fluid channel 350. The compressed air 338 and the fuel 336 can be mixed within the ignition tube 330 to define an ignition mixture 342. An igniter 340 can extend through the igniter wall 348 and ignite the ignition mixture 342 within the ignition tube 330.

The ignition tube 330 is similar to the ignition tube 130, except that the at least one compressed air passage 334 includes a first compressed air passage 356 and a second compressed air passage 358. The first compressed air passage 356 can extend in a first direction through the igniter wall 348, while the second compressed air passage 358 can extend in a second direction, different from the first direction, through the igniter wall 348. As a non-limiting example, the first compressed air passage 356 can extend radially through the igniter wall 348, while the second compressed air passage can extend axially through the igniter wall 348 with respect to the centerline axis 346. Further, the first compressed air passage 356 and the second compressed air passage 358 can be radially or axially displaced from one another with respect to the centerline axis 346. Like the compressed air passage 134, the first compressed air passage 356 or the second compressed air passage 358 can be formed as continuous slits or channels, or discrete passageways within the igniter wall 348. At least one passageway of the first compressed air passage 356 or the second compressed air passage 358 can be formed in any shaped hole extending through the corresponding portion of the igniter wall 348 such as, but not limited to, an elliptical hole, a circular hole, a race-track, a slot, a rectangular hole, or any combination thereof. While referred to as the first compressed air passage 356 and the second compressed air passage 358 it will be appreciated that the first compressed air passage 356 and the second compressed air passage 358 can include any number of one or more discrete holes, slots or channels, extending through a corresponding portion of the igniter wall 348.

The first compressed air passage 356 can include a set of first compressed air passages that are axially spaced with respect to one another. The second compressed air passage 358 can include a set of second compressed air passages that are radially spaced with respect to one another.

The compressed air 338 can be fed to the first compressed air passage 356 and the second compressed air passage 358.

Alternatively, the compressed air 338 can be selectively fed to the first compressed air passage 356 or the second compressed air passage independently of one another. In other words, the compressed air 338 can be selectively fed to one of the first compressed air passage 356, the second compressed air passage 358, or both the first compressed air passage 356 and the second compressed air passage 358. It is contemplated, that the compressed air 338 can be fed to a subset of at least one passageway of the set of first compressed air passages 356 or the set of second compressed air passages 358.

During operation, the compressed air 338 can be fed through the first compressed air passages 356 and the second compressed air passages 358. The compressed air 338 fed through the first compressed air passages 356 can enter the ignition tube 330 as a swirled compressed air, while the compressed air 338 fed through the second compressed air passages 358 can enter the ignition tube 330 as an axial or monodirectional compressed air (e.g., extending in a single direction). The compressed air 338 from the first compressed air passages 356 can mix with the compressed air 338 from the second compressed air passages 358 to define an overall compressed air that flows through the ignition tube 330. When compared to the compressed air 138 in the ignition tube 130 of FIG. 4, the overall compressed air of the ignition tube 330 coming from the first compressed air passage 356 and the second compressed air passage 358 can enable a higher turbulence within the ignition tube 330 due to interaction of multiple air jets of the compressed air 338. This can ultimately result in better mixing of the compressed air 338 with the fuel 336, when compared to the ignition tube 130. Improved or better mixing in turn results in a more reliable or an casier-to-ignite ignition mixture 342 within the ignition tube 330. Further, compressed axial air 338 from second compressed air passage 358 increases the velocity of the fuel 336 in the axial direction. This ultimately reduces the possibility of flame holding within the ignition fuel injector 332. It will be appreciated. As a non-limiting example, the first compressed air passage 356 and the second compressed air passage 358 can be configured to supply the compressed air 338 to the ignition tube 330 as a swirled compressed air or a non-swirled compressed air. In another non-limiting example, the ignition fuel injector 332 can be configured to supply the fuel 336 to the ignition tube 330 as a swirled or non-swirled fuel. Swirling the compressed air 338 and or fuel 336 increases mixing which in turn results in more reliable ignition, as described herein Benefits of the present disclosure include a combustor that includes a hydrogen-containing fuel. Hydrogen-containing fuels have a higher flame temperature than traditional fuels (e.g., fuels not containing hydrogen). That is, hydrogen or a hydrogen mixed fuel typically has a wider flammable range and a faster burning velocity than traditional fuels such petroleum-based fuels, or petroleum and synthetic fuel blends. Conventional combustors include an igniter that extends through the combustor liner that ignites the fuel air mixture directly (e.g., the mixture of fuel and compressed air from the fuel injector/swirler). These igniters can be provided downstream of where the mixture of fuel and compressed air is introduced to the combustion chamber. If pure hydrogen were to be used in this scenario, the hydrogen would disperse once entering the combustion chamber; meaning that hydrogen would enter unwanted regions of the combustion section. This dispersion would ultimately result in uncontrolled combustion in the combustion chamber (e.g., not in the desired location, shape, etc.). It is contemplated that control of the combustion in the combustion chamber by controlling the ignition of the fuel and air mixture can provide for a combustor that can effectively use hydrogen-containing fuel as a fuel source. The combustor, as described herein, includes the ignition tube that is used in place of the conventional igniter. The hydrogen-contain fuel can be ignited within the ignition tube. This creates a controlled space for the ignition such that the output of the ignition tube (e.g., the open flame) can be controlled. In other words, the hydrogen can be ignited within the ignition tube. The ignited hydrogen can exit the ignition tube as a flame that can then be used as an ignition source of the fuel and air mixture (e.g., from the at least one fuel cups described herein) in the combustion chamber. This ultimately results in a control combustion in the combustion chamber, thus ensuring that combustion does not occur in any unwanted regions of the combustion section. The shape of the flame can also be controlled through the selective operation of the ignition tubes (e.g., by feeding only compressed air to at least a subset of the ignition tubes, as described herein) when the ignition tubes are not being used as an ignition source. Further, this operation of not using the ignition tubes as an ignition source (e.g., after ignition has occurred) can be used to create the lean flame within the combustion chamber. Further benefits associated with the use of hydrogen-containing fuel rather than traditional fuels is that hydrogen-containing fuel, when combusted, generates less carbon pollutants without sacrificing engine performance when compared to the traditional fuels. On top of this, the ignition tube can be used to create the lean flame, which further reduces the total amount of pollutants that are generated during combustion of the fuel air mixture or during operation of the turbine engine. As such, the combustion section having the hydrogen-containing fuel, rather than the traditional fuel, results in a more eco-friendly turbine engine that produces less carbon pollutants when compared to a conventional turbine engine.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A turbine engine comprising a combustion section comprising a combustor having a combustor liner and a dome wall, which at least partially define a combustion chamber, at least one fuel cup, provided in the dome wall and including a fuel injector and a swirler, and at least one ignition tube comprising a fluid channel, an outlet directly fluidly coupled to the combustion chamber, and an igniter coupled to the fluid channel.

The turbine engine of any of the preceding clauses, wherein the at least one ignition tubes includes a compressed air passage having a compressed air and an ignition fuel injector having a fuel, with both the compressed air and the fuel being fluidly coupled to the fluid channel.

The turbine engine of any of the preceding clauses, wherein the at least one ignition tube is defined by a centerline axis, and wherein the compressed air passage swirls the compressed air with respect to the centerline axis.

The turbine engine of any of the preceding clauses, wherein the at least one ignition tube is defined by a centerline axis, and wherein the ignition fuel injector swirls the fuel with respect to the centerline axis.

The turbine engine of any of the preceding clauses, wherein the compressed air passage includes a first compressed air passage extending through a first portion of the at least one ignition tube in a first direction, and a second compressed air passage extending through a second portion, different from the first portion, of the at least one ignition tube in a second direction, different from the first direction.

The turbine engine of any of the preceding clauses, wherein a compressed air fed through the first compressed air passage is a swirled compressed air and a compressed air fed through the second compressed air passage is a non-swirled compressed air.

The turbine engine of any of the preceding clauses, wherein the at least one ignition tube is defined by a centerline axis, and wherein the first compressed air passage extends radially through the at least one ignition tube and the second compressed air passage extends axially through the at least one ignition tube, with respect to the centerline axis.

The turbine engine of any of the preceding clauses, wherein the at least one ignition tube is provided along one of either the combustor liner or the dome wall.

The turbine engine of any of the preceding clauses, wherein the at least one ignition tube is provided along the dome wall, and wherein the at least one ignition tube and the at least one fuel cup are each provided along respective portions of the dome wall.

The turbine engine of any of the preceding clauses, wherein the turbine engine defines an engine centerline, and wherein the at least one ignition tube is one of either circumferentially spaced from the at least one fuel cup or circumferentially and radially spaced from the at least one fuel cup with respect to the engine centerline.

The turbine engine of any of the preceding clauses, wherein the at least one ignition tube is included within a plurality of ignition tubes, each provided along respective portions of the dome wall, and the at least one fuel cup is provided within an annular array of fuel cups, each provided along respective portions of the dome wall.

The turbine engine of any of the preceding clauses, wherein each ignition tube of the plurality of ignition tubes are circumferentially spaced with respect to one another and the engine centerline.

The turbine engine of any of the preceding clauses, wherein at least one fuel cup of the annular array of fuel cups is provided between two circumferentially adjacent ignition tubes of the plurality of ignition tubes.

The turbine engine of any of the preceding clauses, wherein during startup of the turbine engine, the fuel is only supplied to the at least one ignition tube and not the at least one fuel cup, and wherein the at least one ignition tube ignites a mixture of fuel and compressed air in the fluid channel to define an ignited fuel mixture, which is supplied to the combustion chamber prior to a fuel or a compressed air being supplied to the at least one fuel cup.

The turbine engine of any of the preceding clauses, wherein after startup of the turbine engine, the at least one ignition tube can selectively supply only the compressed air to the combustion chamber.

The turbine engine of any of the preceding clauses, wherein the at least one ignition tube is defined by a centerline axis extending through the at least one ignition tube and the combustion chamber is defined by a longitudinal axis, and wherein the centerline axis is either parallel to or non-parallel to the longitudinal axis.

The turbine engine of any of the preceding clauses, wherein the fuel is a hydrogen-containing fuel.

The turbine engine of any of the preceding clauses, wherein the combustor is one of a can-annular combustor, a can combustor, or an annular combustor.

A combustor comprising a combustor liner and a dome wall, which at least partially define a combustion chamber, at least one fuel cup, provided in the dome wall and including a fuel injector and a swirler, and at least one ignition tube comprising a fluid channel, an outlet directly fluidly coupled to the combustion chamber, and an igniter coupled to the fluid channel.

The combustor of any preceding clause, wherein the at least one ignition tubes includes a compressed air passage having a compressed air and an ignition fuel injector having a fuel, with both the compressed air and the fuel being fluidly coupled to the fluid channel.

The combustor of any preceding clause, wherein the at least one ignition tube is defined by a centerline axis, and wherein the compressed air passage swirls the compressed air with respect to the centerline axis.

The combustor of any preceding clause, wherein the at least one ignition tube is defined by a centerline axis, and wherein the ignition fuel injector swirls the fuel with respect to the centerline axis.

The combustor of any preceding clause, wherein the compressed air passage includes a first compressed air passage extending through a first portion of the at least one ignition tube in a first direction, and a second compressed air passage extending through a second portion, different from the first portion, of the at least one ignition tube in a second direction, different from the first direction.

The combustor of any preceding clause, wherein a compressed air fed through the first compressed air passage is a swirled compressed air and a compressed air fed through the second compressed air passage is a non-swirled compressed air.

The combustor of any preceding clause, wherein the at least one ignition tube is defined by a centerline axis, and wherein the first compressed air passage extends radially through the at least one ignition tube and the second compressed air passage extends axially through the at least one ignition tube, with respect to the centerline axis.

The combustor of any preceding clause, wherein the at least one ignition tube is provided along one of either the combustor liner or the dome wall.

The combustor of any preceding clause, wherein the at least one ignition tube is provided along the dome wall, and wherein the at least one ignition tube and the at least one fuel cup are each provided along respective portions of the dome wall.

The combustor of any preceding clause, wherein the combustion chamber defines a longitudinal axis, and wherein the at least one ignition tube is one of either circumferentially spaced from the at least one fuel cup or circumferentially and radially spaced from the at least one fuel cup with respect to the longitudinal axis.

The combustor of any preceding clause, wherein the at least one ignition tube is included within a plurality of ignition tubes, each provided along respective portions of the dome wall, and the at least one fuel cup is provided within an annular array of fuel cups, each provided along respective portions of the dome wall.

The combustor of any preceding clause, wherein each ignition tube of the plurality of ignition tubes are circumferentially spaced with respect to one another and the engine centerline.

The combustor of any preceding clause, wherein at least one fuel cup of the annular array of fuel cups is provided between two circumferentially adjacent ignition tubes of the plurality of ignition tubes.

The combustor of any preceding clause, wherein during startup of the combustor, the fuel is only supplied to the at least one ignition tube and not the at least one fuel cup, and wherein the at least one ignition tube ignites a mixture of fuel and compressed air in the fluid channel to define an ignited fuel mixture, which is supplied to the combustion chamber prior to a fuel or a compressed air being supplied to the at least one fuel cup.

The combustor of any preceding clause, wherein after startup of the combustor, the at least one ignition tube can selectively supply only the compressed air to the combustion chamber.

The combustor of any preceding clause, wherein the at least one ignition tube is defined by a centerline axis extending through the at least one ignition tube and the combustion chamber is defined by a longitudinal axis, and wherein the centerline axis is either parallel to or non-parallel to the longitudinal axis.

The combustor of any preceding clause, wherein the fuel is a hydrogen-containing fuel.

The combustor of any preceding clause, wherein the combustor is one of a can-annular combustor, a can combustor, or an annular combustor.

The combustor of any preceding clause, wherein the combustion chamber defines a longitudinal axial, wherein the combustion chamber extends an axial length with respect to the longitudinal axis, and wherein the ignition tube extends is provided along a portion of the combustion chamber that is 0 to 0.4 times the axial length, with 0 corresponding to a protein of the dome wall.

The combustor of any preceding clause, wherein the combustion chamber is defined by a longitudinal axial, and wherein the at least one ignition tube and the at least one fuel cup are each provided along respective portions of the dome wall and circumferentially spaced from one another with respect to the longitudinal axis.

A method of operating a turbine engine having a combustion section having a dome wall and a combustor liner, which together at least partially define a combustion chamber, the combustion section further comprising at least one fuel cup provided on the dome wall and an ignition tube comprising a fluid channel, an outlet directly fluidly coupled to the combustion chamber, and an igniter coupled to the fluid channel, the method comprising receiving a flow of a fuel and a compressed air in the ignition tube, the fuel and the compressed air mixing within the ignition tube to defined a first mixture of fuel and air, igniting, via the igniter, a first mixture of the fuel and the compressed air within the ignition tube to define flame, supplying the flame to the combustion chamber, supplying, via the at least one fuel cup, a second mixture of fuel and air to the combustion chamber, and igniting the second mixture of fuel and air via the flame.

The method of any preceding clause, further comprising suppling, via the at least one fuel cup, the second mixture of fuel and air to the combustion chamber after the flame has been supplied to the combustion chamber.

The method of any preceding clause, further comprising ceasing the receiving of at least one of either the flow of the fuel or the compressed air within the ignition tube after the second mixture is ignited by the flame.

The method of any preceding clause, further comprising ceasing the receiving of the flow of fuel within the ignition tube after the second mixture is ignited by the flame.

The method of any preceding clause, further comprising supply, via the ignition tube, only compressed air to the combustion chamber after the second mixture of fuel and air is ignited.

The method of any preceding clause, further comprising varying, via the ignition tube, at least one axial, radial, or circumferential movement of the compressed air within the ignition tube prior to it being supplied to the combustion chamber.

The method of any preceding clause, further comprising swirling, via the ignition tube, at least one of the fuel or the compressed air.

The method of any preceding clause, further comprising providing, via at least one compressed air passage of the ignition tube, the compressed air to the ignition tube.

The method of any preceding clause, wherein the ignition tube is defined by a centerline axis, the method further comprising supplying, via a first compressed air passage extending radially through the ignition tube with respect to the centerline axis, to the ignition tube, supplying, via a second compressed air passage extending axially through the ignition tube with respect to the centerline axis, to the ignition tube, and mixing, within the ignition tube, the compressed air form the first compressed air passage and the second compressed air passage.

The method of any preceding clause, further comprising receiving a flow of a hydrogen-containing fuel within the ignition tube.

A method of assembling a combustor for a turbine engine defined by an engine centerline, the combustor having a dome wall and a combustor liner that together at least partially define a combustion chamber, the combustor further comprising at least one fuel cup, and an ignition tube comprising a fluid channel, an outlet directly fluidly coupled to the combustion chamber, and an igniter coupled to the fluid channel, the method comprising aligning the at least one fuel cup within the combustor such that it extends through a first portion of the dome wall, and aligning the at least one ignition tube within the combustor such that it extends through one of either a second portion of the dome wall, different from the first portion, or a portion of the combustor liner.

The method of any preceding clause, further comprising fluidly coupling the ignition tube to a fuel source that is adapted to include a hydrogen-containing fuel.

The method of any preceding clause, further comprising fluidly coupling the fuel cup to a fuel source that is adapted to include a hydrogen-containing fuel.

The method of any preceding clause, further comprising aligning the at least one ignition tube such that it extends through the second portion of the dome wall.

The method of any preceding clause, further comprising radially spacing the first portion from the second portion with respect to the engine centerline.

The method of any preceding clause, further comprising circumferentially spacing the first portion from the second portion with respect to the engine centerline.

The method of any preceding clause, further comprising circumferentially and radially spacing the first portion from the second portion with respect to the engine centerline.

The method of any preceding clause, further comprising aligning a plurality of ignition tubes including the at least one ignition tube with respect to a annular array of fuel cups having the at least one fuel cup, wherein each ignition tube of the plurality of ignition tubes extends through a respective first portion of the dome wall and each fuel cup of the annular array of fuel cups extends through a respective second portion of the dome wall.

The method of any preceding clause, further comprising at least two fuel cups of the annular array of fuel cups such that an ignition tube of the plurality of ignition tubes is not provided between a circumferential area between the at least two fuel cups.

The method of any preceding clause, wherein the combustion chamber is defined by a longitudinal axis and the combustion chamber extends an axial length with respect to the longitudinal axis, and wherein the method further comprises aligning the at least on ignition tube such that the ignition tube corresponds to a portion of the axial length that is less than or equal to 0.4 times the axial length, with 0 times the axial length corresponding to a portion of the dome wall.

What is claimed is:

1. A method of supplying a first fuel and air mixture and a second fuel and air mixture to a combustor, the combustor having:
    a combustion chamber;
    a combustor liner and a dome wall collectively defining the combustion chamber;
    at least one fuel cup exhausting into the combustion chamber, the at least one fuel cup extending through the dome wall at a first location of the combustor; and
    at least one ignition tube comprising:
        an outlet exhausting to the combustion chamber, the at least one ignition tube extending through at least one of either the dome wall or the combustor liner at a second location of the combustor, separate from the first location;
        a centerline axis;
        an igniter wall having an upstream end portion and a downstream end portion axially spaced from the upstream end portion, the downstream end portion having an upstream end and a downstream end, the downstream end portion having a substantially constant cross-sectional area, perpendicular to the centerline axis, from the upstream end to the downstream end, the igniter wall converging radially inward from the upstream end portion of the igniter wall to the upstream end of the downstream end portion; and
        an ignition fuel injector circumferentially surrounded by, and spaced from, the upstream end portion of the igniter wall;
    the method comprising:
    supplying a first flow of fuel and a first flow of compressed air to only the at least one ignition tube to define the first fuel and air mixture;
    igniting, via an igniter provided along the at least one ignition tube, the first fuel and air mixture to define a first ignited fuel and air mixture;
    supplying, through the outlet of the at least one ignition tube, the first ignited fuel and air mixture to the combustion chamber at the second location;
    supplying, after supplying the first ignited fuel and air mixture to the combustion chamber, a second flow of fuel and a second flow of compressed air to the at least one fuel cup to define the second fuel and air mixture; and
    supplying the second fuel and air mixture to the combustion chamber at the first location.

2. The method of claim 1, further comprising igniting, via the first ignited fuel and air mixture, the second fuel and air mixture to define a second ignited fuel and air mixture.

3. The method of claim 2, further comprising:
    stopping the supply of the first flow of fuel to the at least one ignition tube after ignition of the second fuel and air mixture; and
    supplying the first flow of compressed air to the at least one ignition tube during ignition of the second fuel and air mixture.

4. The method of claim 3, further comprising shaping, via the first flow of compressed air, the second ignited fuel and air mixture.

5. The method of claim 1, further comprising supplying, through the at least one ignition tube, the first ignited fuel and air mixture to the combustion chamber through a portion of the dome wall.

6. The method of claim 1, wherein the at least one ignition tube comprises a plurality of ignition tubes, and the method further comprises supplying the first flow of fuel and the first flow of compressed air to each ignition tube of the plurality of ignition tubes to define the first fuel and air mixture.

7. The method of claim 1, wherein the at least one ignition tube comprises a plurality of ignition tubes, with only a subset of ignition tubes of the plurality of ignition tubes including a respective ignitor.

8. The method of claim 7, wherein the at least on fuel cup comprises plurality of fuel cups, the method further comprising supplying the second flow of fuel and the second flow of compressed air to at least a portion of the plurality of fuel cups including the at least one fuel cup to define the second fuel and air mixture after ignition of the first fuel and air mixture.

9. The method of claim 1, wherein the second flow of fuel includes a flow of hydrogen-containing fuel.

10. The method of claim 1, further comprising supplying the first flow of fuel and the first flow of compressed air to only the at least one ignition tube to define the first fuel and air mixture, wherein the first flow of fuel includes a hydrogen-containing fuel.

11. The method of claim 1, wherein the combustor is provided within a turbine engine.

12. The method of claim 1, further comprising swirling the first fuel and air mixture within the at least one ignition tube.

13. The method of claim 1, further comprising supplying, through the at least one ignition tube, the first ignited fuel and air mixture to the combustion chamber within a portion of the combustion chamber that is 0 to 0.4 times an axial length of the combustion chamber, with 0 times the axial length corresponding to where the at least one ignition tube is mounted to a respective portion of the dome wall.

14. The method of claim 1, wherein the second location is provided along the dome wall.

15. The method of claim 1, wherein the at least one ignition tube comprises a plurality of ignition tubes, the method further comprising:

supplying the first flow of fuel and the first flow of compressed air to a subset of the ignition tubes of the plurality of ignition tubes to define the first fuel and air mixture, the subset of ignition tubes being less than an entirety of the ignition tubes of the plurality of ignition tubes;

igniting, via the igniter, the first fuel and air mixture to define the first ignited fuel and air mixture;

supplying, through the outlets of the subset of ignition tubes, the first ignited fuel and air mixture to the combustion chamber at the second location.

16. The method of claim 15, further comprising swirling the first fuel and air mixture within the subset of ignition tubes.

17. The method of claim 15, further comprising supplying, through the subset of ignition tubes, the first ignited fuel and air mixture to the combustion chamber within a portion of the combustion chamber that is 0 to 0.4 times an axial length of the combustion chamber, with 0 times the axial length corresponding to where the subset of ignition tubes is mounted to a respective portion of the dome wall.

18. The method of claim 1, wherein:
the combustion chamber has a longitudinal axis;
the at least one fuel cup comprises a plurality of fuel cups exhausting into the combustion chamber;
the at least one ignition tube comprises a plurality of ignition tubes, with at least two fuel cups of the plurality of fuel cups being provided circumferentially between two circumferentially adjacent ignition tubes of the plurality of ignition tubes, with respect to the longitudinal axis;

the method further comprises:
supplying the first flow of fuel and the first flow of compressed air to at least a portion of the ignition tubes of the plurality of ignition tubes to define the first fuel and air mixture;
supplying, through the outlets of the portion of the ignition tubes of the plurality of ignition tubes, the first ignited fuel and air mixture to the combustion chamber;
supplying, after supplying the first ignited fuel and air mixture to the combustion chamber, the second flow of fuel and the second flow of compressed air to the plurality of fuel cups to define the second fuel and air mixture.

19. The method of claim 18, wherein at least three fuel cups of the plurality of fuel cups are provided circumferentially between two circumferentially adjacent ignition tubes of the plurality of ignition tubes.

20. The method of claim 18, wherein:
the plurality of ignition tubes includes a first ignition tube, a second ignition tube, and a third ignition tube with the third ignition tube being provided circumferentially between the first ignition tube and the second ignition tube; and
the plurality of fuel cups includes a first number of fuel cups provided circumferentially between the first ignition tube and the second ignition tube, and a second number of fuel cups provided circumferentially between the second ignition tube and the third ignition tube, the second number of fuel cups being non-equal to the first number of fuel cups.

* * * * *